(12) United States Patent
Veeraraghavan et al.

(10) Patent No.: US 9,590,528 B2
(45) Date of Patent: Mar. 7, 2017

(54) DUAL MODE DC-AC INVERTER SYSTEM AND OPERATION

(71) Applicant: Kripya LLC, Sammamish, WA (US)

(72) Inventors: Vilakkudi G. Veeraraghavan, Sammamish, WA (US); Ramarao Ananathakrishnan, Coimbatore (IN); Muthiam S Balavenkataraman, Coimbatore (IN)

(73) Assignee: Kripya LLC, Sammamish, WA (US)

( * ) Notice: Subject to any disclaimer, the term of this patent is extended or adjusted under 35 U.S.C. 154(b) by 0 days.

(21) Appl. No.: 15/043,205

(22) Filed: Feb. 12, 2016

(65) Prior Publication Data

US 2016/0164431 A1 Jun. 9, 2016

Related U.S. Application Data

(63) Continuation-in-part of application No. 14/616,608, filed on Feb. 6, 2015, now Pat. No. 9,444,366.

(60) Provisional application No. 61/978,594, filed on Apr. 11, 2014.

(51) Int. Cl.
*H02M 1/08* (2006.01)
*H02M 7/44* (2006.01)
*H02J 3/38* (2006.01)
*G05F 1/67* (2006.01)

(52) U.S. Cl.
CPC ............... *H02M 7/44* (2013.01); *G05F 1/67* (2013.01); *H02J 3/383* (2013.01); *H02J 3/385* (2013.01)

(58) Field of Classification Search
CPC ................................ H02M 1/08; H02M 7/537

USPC .......................... 363/72, 95, 97, 98
See application file for complete search history.

(56) References Cited

U.S. PATENT DOCUMENTS

| | | | |
|---|---|---|---|
| 5,991,181 A | 11/1999 | Fujii et al. | |
| 7,855,906 B2 | 12/2010 | Klodowski et al. | |
| 8,310,214 B2 | 11/2012 | Garces et al. | |
| 8,861,230 B2 | 10/2014 | Sigamani et al. | |
| 9,042,134 B2 | 5/2015 | Liu et al. | |
| 9,444,366 B2 * | 9/2016 | Veeraraghavan | H02M 7/44 |
| 2002/0036911 A1 | 3/2002 | Okui | |
| 2004/0170038 A1 | 9/2004 | Ichinose et al. | |

(Continued)

OTHER PUBLICATIONS

PCT Search Report and Written Opinion for PCT Application No. PCT/US15/14923, mailed May 15, 2015, 9 pages.

*Primary Examiner* — Jeffrey Sterrett
(74) *Attorney, Agent, or Firm* — Lee & Hayes, PLLC

(57) ABSTRACT

A dual mode direct current-to-alternating current (DC-AC) inverter is capable of operating either with or without connection to an active external AC power source. The dual mode DC-AC inverter may operate in "current control mode" when connection to the active AC power source is present and may operate in "power control mode" when connection to the active external AC source is absent. Processes for operating an array of these DC-AC inverters are disclosed. The dual mode operation capability enables the DC-AC inverters to function both in the grid connected mode (i.e., current control mode) as well as off-grid mode (i.e., power control mode). The system is configured to sense the presence or absence of grid power and automatically select the appropriate mode of operation. For the power control mode of operation, a process may include designating a master from the array of DC-AC inverters in order to establish the voltage and frequency reference.

19 Claims, 10 Drawing Sheets

(56) References Cited

U.S. PATENT DOCUMENTS

| | | |
|---|---|---|
| 2004/0207366 A1 | 10/2004 | Sung |
| 2007/0159866 A1 | 7/2007 | Siri |
| 2008/0278983 A1 | 11/2008 | Park |
| 2010/0253151 A1 | 10/2010 | Gerhardinger et al. |
| 2013/0155735 A1 | 6/2013 | Ilic et al. |
| 2013/0336025 A1 | 12/2013 | Figueroa et al. |
| 2015/0092462 A1 | 4/2015 | Ohori et al. |
| 2015/0200607 A1 | 7/2015 | Fujii et al. |
| 2015/0270788 A1 | 9/2015 | Sawano |
| 2015/0288295 A1 | 10/2015 | Yu et al. |
| 2015/0295511 A1 | 10/2015 | Veeraraghavan et al. |
| 2016/0141978 A1 | 5/2016 | Matsuoka et al. |
| 2016/0164431 A1* | 6/2016 | Veeraraghavan ....... H02J 3/383 363/95 |

\* cited by examiner

DUAL MODE DC-AC INVERTER SYSTEM AND OPERATION

CROSS REFERENCE TO RELATED APPLICATIONS

This application is a continuation-in-part of co-pending, commonly owned U.S. patent application Ser. No. 14/616,608, filed Feb. 6, 2015, and entitled "DUAL MODE MICRO-INVERTER SYSTEM AND OPERATION," which is based on and claims priority to U.S. Provisional Application No. 61/978,594, filed on Apr. 11, 2014, entitled "DUAL MODE MICRO-INVERTER SYSTEM AND OPERATION," the entirety of which are herein incorporated by reference.

BACKGROUND

Direct current-to-alternating current (DC-AC) inverters offer a means for providing ready-to-use alternating current (AC) at the point of an energy source, which makes them attractive for distributed energy generation systems of varying capacities such as solar energy systems. Because of these benefits, the use of DC-AC inverters are on the rise year to year.

DC-AC inverters that are in the market today operate in the "grid-tie mode." This means that, in order for the DC-AC inverter to be functional, grid power has to be present. However, when grid power is absent in the "grid-tie mode," no harvesting of solar energy is possible. This is a serious limitation in regions across the globe where the access to, and reliability of, grid power is limited.

SUMMARY

Disclosed herein is a dual mode direct current-to-alternating current (DC-AC) inverter that is configured with dual closed-loop control options. A first closed-loop control option may comprise a closed-loop current control algorithm and associated control algorithm for operation of the dual mode DC-AC inverter during conditions where an active external power source provides a reference voltage and frequency. A second closed-loop control option may comprise a closed-loop power control algorithm and associated algorithm for operation of the dual mode DC-AC inverter during conditions where the external power source is absent or otherwise inactive (i.e., the external power source does not provide a reference voltage and frequency). In the second closed-loop control option (i.e., power control mode), the voltage, power, and frequency references can be synthesized internally by a built-in algorithm in the DC-AC inverter and the closed loop power control maintains the quality of the power output.

The dual mode DC-AC inverter may be configured to sense the presence or absence of an external AC power source and, in response, select the appropriate closed-loop control option and associated algorithm for control purposes.

In some embodiments, an array of DC-AC inverters may be interconnected. When grid power from the external AC power source is absent for the array of DC-AC inverters, a software algorithm may enable dynamic polling of the status of individual ones of the DC-AC inverters in the array, identifying one of the DC-AC inverters that returns an acknowledgement, and selecting the identified DC-AC inverter as the master for providing the voltage, power, and frequency references for remaining ones of the DC-AC inverters in the array to follow.

Also disclosed is a process for dynamically monitoring the performance of each of the dual mode DC-AC inverters in an array, and turning off individual DC-AC inverters that are not meeting the performance specifications.

Also disclosed is a dual mode DC-AC inverter array configured to work in conjunction with an active load manger to control the total load connected to the array of DC-AC inverters such that cumulative power drawn by the total load is less than the total output power generated by the array when the external AC power source is absent or not active.

Also disclosed are two approaches, based on relay network arrangements, for the isolation of an external AC power source from the array of DC-AC inverters and forming a local grid in the case when the external AC power source is not active.

The dual-mode DC-AC inverter disclosed herein enables harvesting of solar power whenever solar radiation is present, and such harvesting of solar power is not dependent on the presence of an active external AC power source.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

In the following detailed description of the embodiments, specific detailed examples are given in order to provide an understanding of the embodiments. However, it is to be appreciated that the embodiments may be practiced without these specific details. Furthermore, the techniques and systems disclosed herein are not limited to the described embodiments. Numerous modifications, changes, variation, substitutions and equivalents will be apparent to those skilled in the art.

Figure 1:
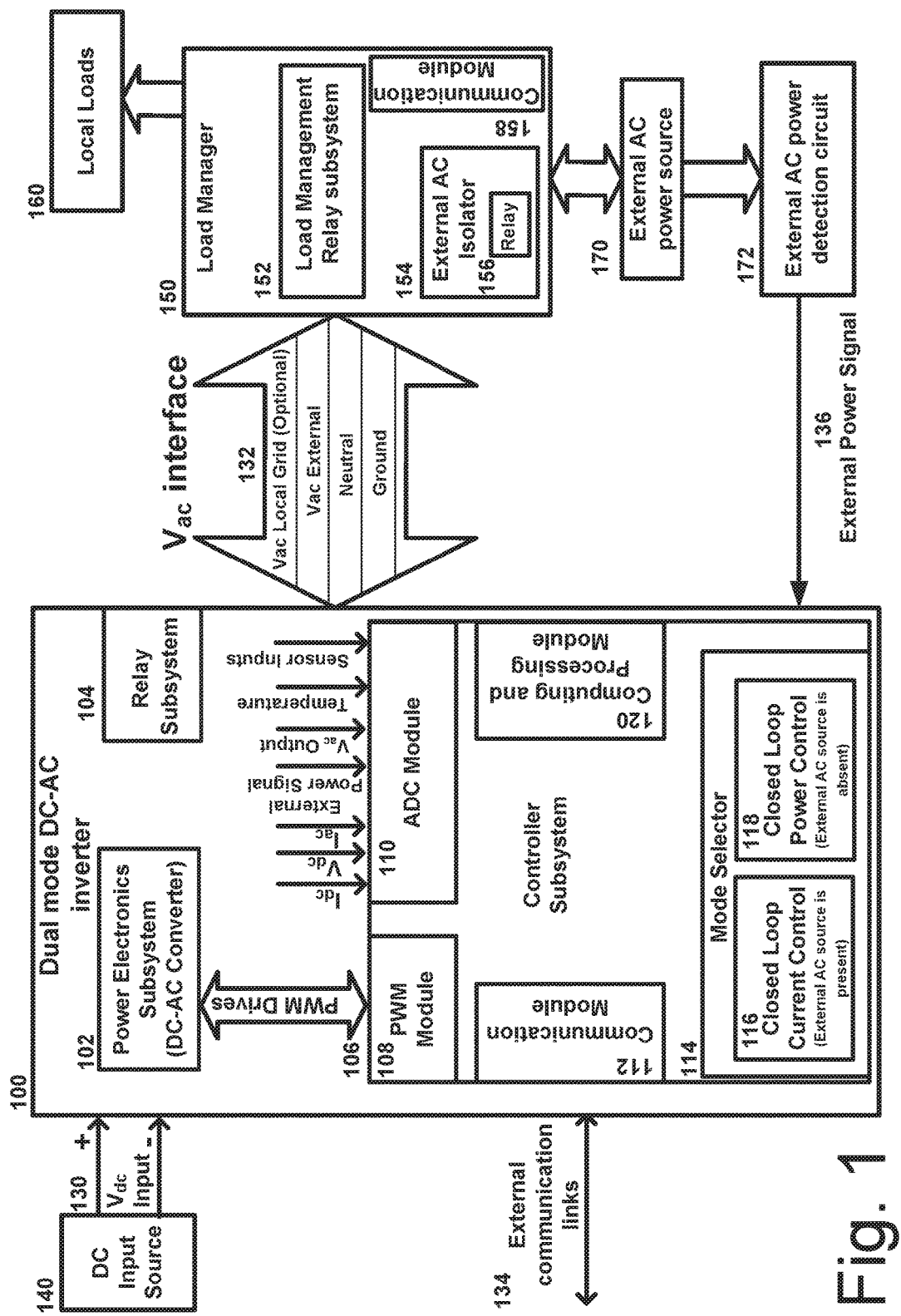
FIG. 1 is a schematic block diagram of an example dual mode DC-AC inverter illustrating example sub-systems of the inverter along with input, output, and communication interfaces.

FIG. 1 is a schematic block diagram of an example dual mode DC-AC inverter 100 illustrating example subsystems along with input, output, and communication interfaces.

The dual mode DC-AC inverter 100 (sometimes referred to herein as the "inverter 100", "DC-AC inverter 100", "dual mode inverter 100", or "dual mode DC-AC inverter 100") may include various subsystems. For example, the inverter 100 may include a power electronics subsystem 102 (or "DC-AC converter 102") for the conversion of DC to AC, and a controller subsystem 106 (which may be a Digital Signal Controller, programmable micro-controller, System on Chip or Field Programmable Gate Array) that may include a computing and processing module 120, an analog-to-digital converter (ADC) module 110, a pulse width modulation (PWM) module 108, a communication module 112, and a mode selector module 114. The mode selector module 114 may include a closed-loop current control algorithm 116 and closed-loop power control algorithm 118.

The dual mode DC-AC inverter 100 may be interfaced with a direct current (DC) input source 140 on the input side, and to a load manager 150 on the output side. The load manager 150 may be coupled to an external AC power source 170 and one or more local loads 160.

A control circuit 172 (sometimes called "external AC power detection circuit" 172) may be configured to detect the status (i.e., presence or absence) of active external AC power in the external AC power source 170 and communicate the status to the dual mode DC-AC inverter 100 for mode selection.

$V_{dc}$ input 130 represents the analog signal input from the DC input source 140 to the dual mode DC-AC inverter 100. External bidirectional communication link(s) 134 represents the signals flow between the communication module 112 and one or more external/remote monitoring devices for monitoring and controlling the performance of DC-AC inverter 100.

$V_{ac}$ Interface 132 represents the analog signal output connections including ($V_{ac}$ External, Neutral, Ground, and optional $V_{ac}$ Local Grid) from the dual mode DC-AC inverter 100. The $V_{ac}$ Interface 132 may be connected to the load manager 150. $V_{ac}$ Local grid (of the $V_{ac}$ Interface 132) is an optional output connection used in the case of a 4-wire interconnection. In the case when optional $V_{ac}$ Local Grid output connection is present, the relay subsystem 104 is utilized to divert the AC output of the DC-AC inverter 100 either to the $V_{ac}$ External or $V_{ac}$ Local Grid depending on the presence or absence of external power signal 136. Based at least in part on external power signal 136 provided by the control circuit 172, the mode selector module 114 may select a closed-loop current control mode (where External power signal is present) or a closed-loop power control mode (where External power signal is absent) of operation for the dual mode DC-AC inverter 100. In some embodiments, the external power signal 136 input value is binary with a value of "1" when the external AC power source 170 is present and active, and a value of "0" when the external AC power source 170 is absent or inactive.

The ADC module 110 may receive analog input values for the DC voltage ($V_{dc}$), DC current ($I_{dc}$), $V_{ac}$ Output, AC current ($I_{ac}$), external power signal as well as temperature of one or more components from respective sensor circuits, and may convert the analog input values into digital values. The Computing and Processing Module 120 may compute parameters for the operation of the closed-loop current control algorithm 116 or the closed-loop power control algorithm 118, depending on the selected mode of operation. In some embodiments, the computing and processing module 120 incorporates fault protection features when the digitized values are outside of an allowable range for individual ones of the parameters by tripping the dual mode DC-AC inverter 100 to the off state. For example, if the controller subsystem 106 has been programmed to accept minimum input DC voltage $V_{dc}$ 130 of X volts, but the actual input DC voltage signal $V_{dc}$ 130 received is less than X volts, the DC-AC inverter 100 can be tripped to the off state and the corresponding error code can be communicated to the external/remote monitors via the communication module 112.

The controller subsystem 106 may also incorporate a software algorithm to enable Maximum Power Point Tracking (MPPT) from the DC input source 140 such that the maximum possible energy is harvested from the DC input source 140. The MPPT algorithm enables the DC input source 140, such as a solar panel, to operate within a range of voltages corresponding to the peak of the power-voltage (P-V) curve for the panel, for a given set of environmental conditions, such as available solar radiation and temperature, and load conditions. As the environmental and load conditions change, the MPPT algorithm provides the means for dynamically adjusting the operating point to derive maximum power possible.

Based at least in part on the output of the closed-loop current control algorithm 116 or the closed-loop power control algorithm 118 (whichever mode is selected), the PWM module 108 may generate the PWM drive signals for the power electronics subsystem 102.

The power electronics subsystem 102 may include electronics (e.g., high frequency transformers, filter and regulation circuits, etc.) for the conversion of DC to AC. AC output from the power electronics subsystem 102 may be fed, via the $V_{ac}$ interface 132, into the load manager 150, and the load manager 150 may be coupled to the external AC power source 170 and the local load(s) 160.

In the case when the external AC power source 170 is present and active, the AC output from the dual mode DC-AC inverter 100 may be fed, via the $V_{ac}$ interface 132, into the load manager 150 which serves as a pass through to the AC Power source 170. In the case when the external AC power source 170 is absent and/or inactive, the AC output from the dual mode DC-AC inverter 100 may be directed to the local load(s) 160 via the $V_{ac}$ interface 132 and the load manager control circuit 150.

The load manager 150 may include various subsystems. For example load manager 150 may include a load management relay subsystem 152 for distributing the AC output received via the $V_{ac}$ interface 132 to the local load(s) 160 based on the power available from the DC input source 140. The load manager 150 may include an external AC isolator 154 to isolate the external AC power source 170 from the DC-AC inverter 100 through relay subsystem 156 during conditions where the external AC power source 170 is absent or inactive. The load manager 150 may include communication module 158 to communicate parameters relating to external AC power source 170 present or absent conditions, power consumed by the local loads 160, power delivered by the DC input source 140, and so on, with DC-AC inverter 100 external/remote monitors.

The DC input source 140 can be of any suitable kind of DC input source as long as the voltage and power specifications are consistent with the input specifications for the dual mode DC-AC inverter 100. Some suitable examples of the DC input source 140 include, but are not limited to: (a) one or more photo voltaic solar panels, (b) one or more fuel cells, (c) one or more batteries, (d) one or more wind energy generators, or (e) one or more ultra-capacitors.

The dual mode DC-AC inverter 100 specifications may accept a variety of input sources, as well as provide output AC voltage via the $V_{ac}$ interface 132 that is readily usable in the environment it is employed. The power electronics subsystem 102 (or DC-AC conversion subsystem) for the dual mode DC-AC inverter 100 can be of different types as long as power conversion and regulation can be controlled via a PWM drive signal from the PWM module 108. For example, the conversion electronics in the power electronics subsystem 102 may include, without limitation: (a) a single stage DC-AC conversion system, (b) two stage DC-DC-AC conversion system, accomplished by using one or more high frequency transformers.

The dual mode DC-AC inverter 100 can be applied in environments where the external AC power source 170 can either be a GRID power or a local AC generator such as a diesel generator.

The external power detection circuit 172 may include, without limitation, an attenuation circuit, an isolation circuit, an analog amplifier, and an analog comparator section. The external AC voltage is attenuated and isolated by the external power detection circuit 172. The isolated external AC signal can be applied to the analog amplifier of the external power detection circuit 172 to generate analog output. The analog amplifier output can be compared by an analog comparator of the external power detection circuit 172 with a predefined reference voltage to generate the digital external power signal 136 according to the presence or absence of the external AC power source 170.

The load manager 150 control circuitry may partition the local loads 160 connected to it into units, each unit with a defined max power demand. Each of the partitioned units may be turned on or off via a load management relay subsystem 152 by communication module 158 utilizing wired or wireless means. The control circuitry of the load manager 150 may compute the total generated power by querying the controller subsystem 106 of the dual mode DC-AC inverter 100 via the communication link 134. Based on the computed total generated power, the load manager 150 control circuitry may limit the number of units to be turned on via load management relay subsystem 152 such that the total power drawn by the units that are on is less than the total power generated.

FIGS. 2-4 and 6-8 illustrate example processes that may be carried out to perform the techniques described herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

Figure 2:
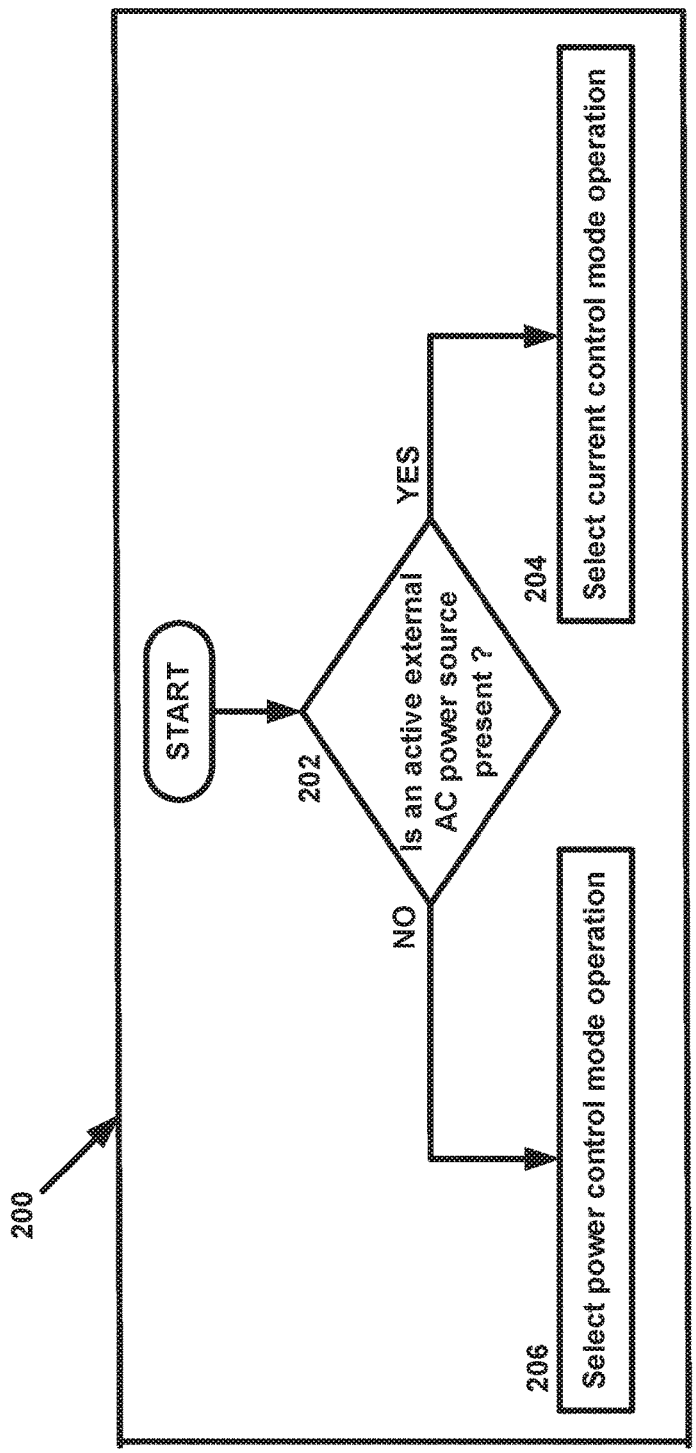
FIG. 2 is a flow diagram of an illustrative process for selecting an operating mode for an example dual mode DC-AC inverter.

FIG. 2 is a flow diagram of an illustrative process 200 for the selection of the current control mode or the power control mode of operation for the dual mode DC-AC inverter 100 based on the presence or absence of the external AC power source 170. At 202, a determination is made as to whether the external power signal 136 of the external power detection circuit 172 indicates that an active external AC power source 170 is present. If the active external AC power source 170 is present at 202, a control mode selection is made at 204 by the mode selector 114 that selects the current control mode of operation. If the external AC power source 170 is absent or inactive at 202, a control mode selection is made at 206 by the mode selector 114 that selects the power control mode of operation.

Figure 3:
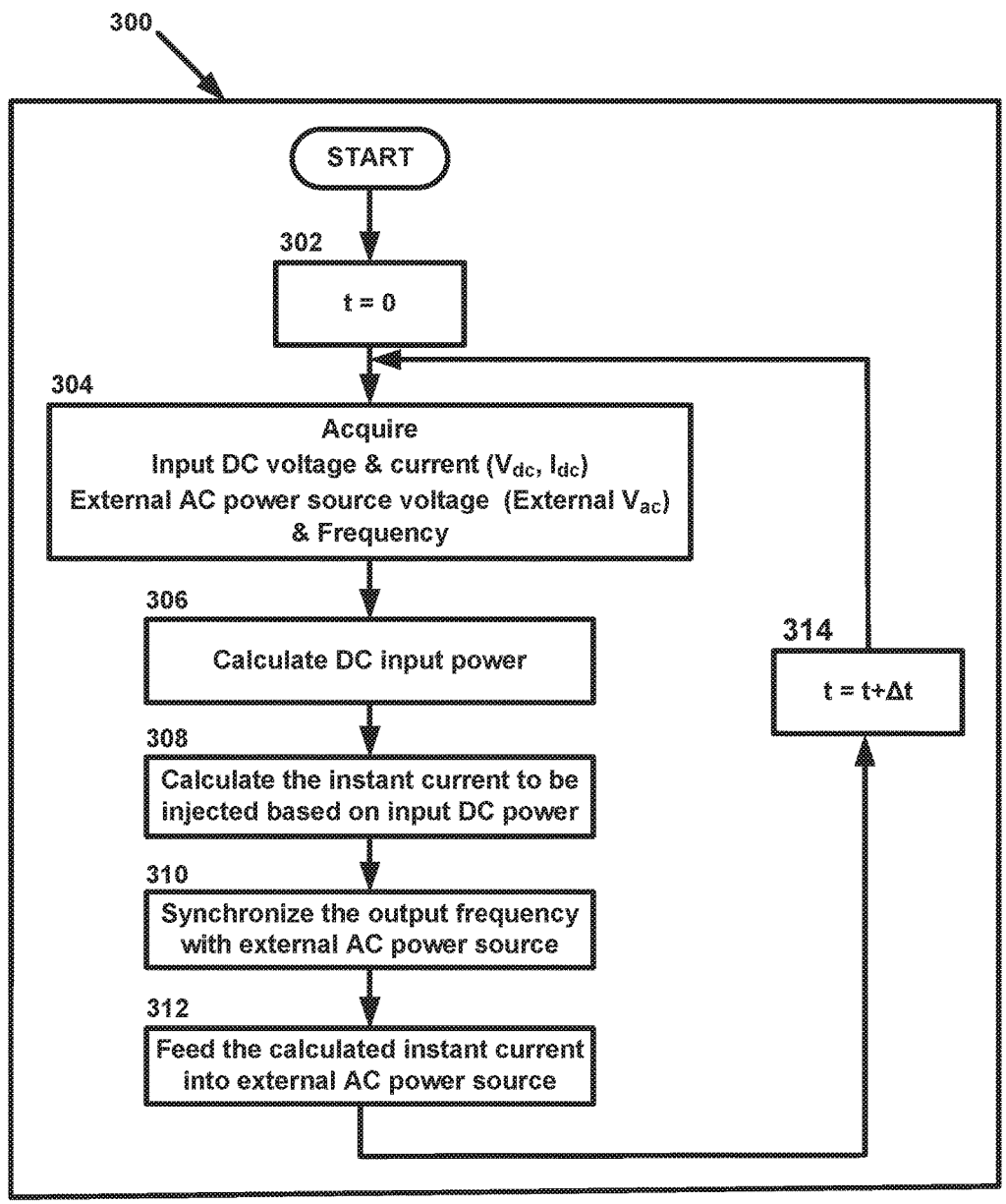
FIG. 3 is a flow diagram of an illustrative process for carrying out a current control mode of operation of an example dual mode DC-AC inverter.

FIG. 3 is a flow diagram of an illustrative process 300 for operation of the dual mode DC-AC inverter 100 when it is operating in the current control mode (the active external AC power source 170 is present). The process 300 may continue from step 204 of FIG. 2 where the current control mode of operation was selected. In the current control mode of operation, a start clock is set at time, t=0, as indicated in the step 302. At 304, the input power parameters ($V_{dc}$ and $I_{dc}$) and the output parameters ($V_{ac}$ and frequency) are sampled at each time interval. At 306, the computing module 120 may compute the amount of available DC power based on the $V_{dc}$ and $I_{dc}$ input parameters that were sampled at 304. At 308, based on the available DC power and the AC voltage of the active external AC power source 170, the amount of current that can be fed into the AC power source 170 is computed by the computing module 120. At 310, the closed loop current control algorithm 116 ensures that the voltage and frequency of the current fed into the external AC power source 170 substantially matches the voltage and frequency of the active external AC power source 170. At 312, the current at proper voltage and frequency that was computed at 308 is fed into the power source 170. This current control process flow (steps 304-312) is repeated at high frequency (for example 56 KHz) with time interval Δt (for example 17.85 micro seconds) as indicated in step 314.

Figure 4:
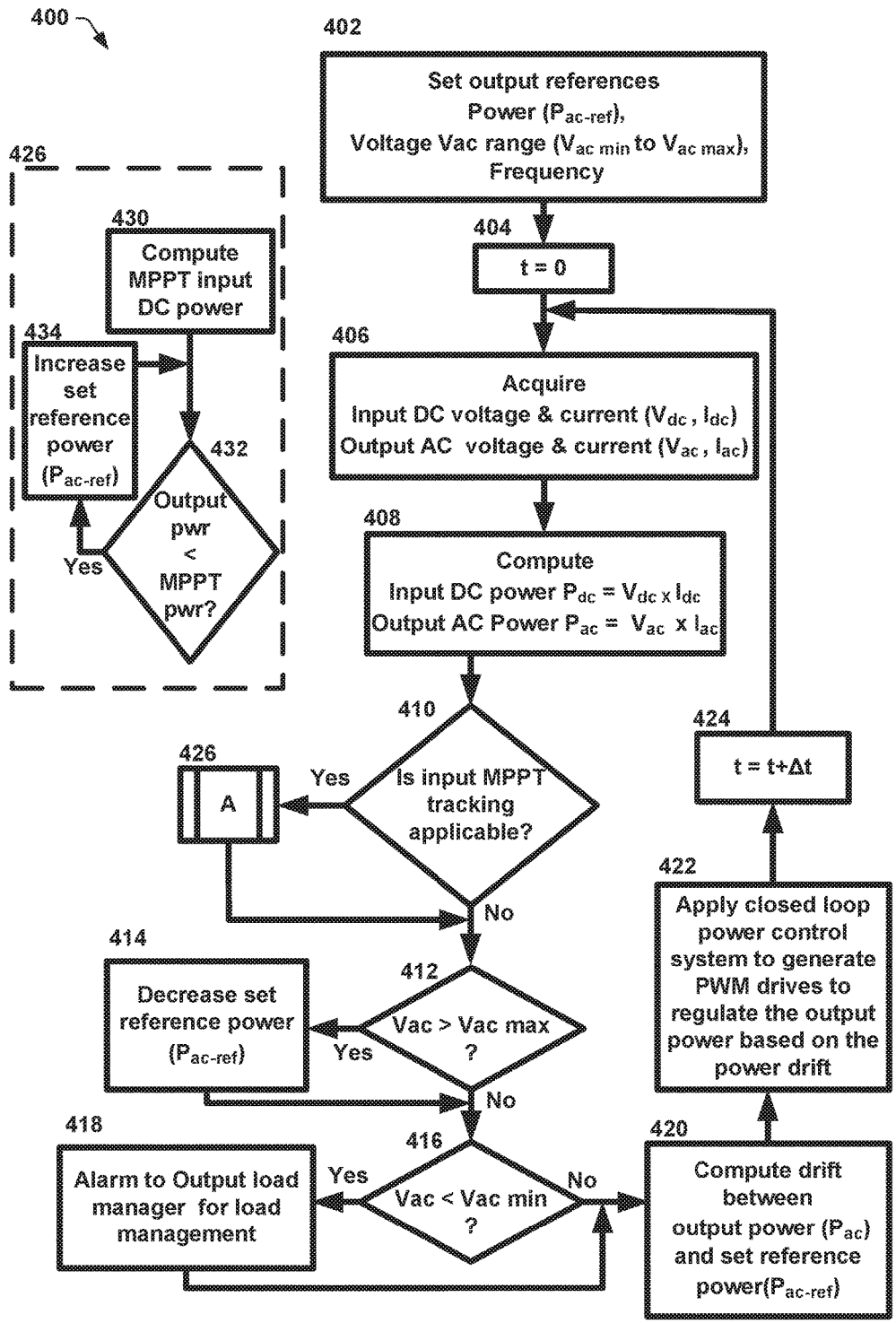
FIG. 4 is a flow diagram of an illustrative process for carrying out a power control mode of operation of an example dual mode DC-AC inverter.

FIG. 4 is a flow diagram of an illustrative process 400 for operation of the dual mode DC-AC inverter 100 when it is operating in the power control mode (the external AC power source 170 is absent/inactive). The process 400 may continue from step 206 of FIG. 2 where the power control mode of operation was selected. In this mode of operation, as there is no voltage or frequency references available from the external power source 170, a reference voltage range ($V_{ac}$ min to $V_{ac}$ max) and frequency reference from pre-programmed values are synthesized and set at 402 by the power control algorithm 118. In addition an output power value $P_{ac\text{-}ref}$ is set as a reference.

The output of the dual mode DC-AC inverter 100 can then synchronize with the synthesized voltage range ($V_{ac}$ min to $V_{ac}$ max) and frequency. At 404, a clock is set at t=0. At 406, the input power parameters ($V_{dc}$, $I_{dc}$) and the output power parameters ($V_{ac}$, $I_{ac}$) are sampled at each time interval by the ADC module 110. At 408, the input DC power $P_{dc}$ ($V_{dc}*I_{dc}$) and output AC power $P_{ac}$ ($V_{ac}*I_{ac}$) are calculated.

Applicability of MPPT input tracking is checked at 410 by the computing and processing module 120 for MPPT applicable input sources. If MPPT input tracking is applicable, MPPT power control process 426 is deployed, denoted in FIG. 4 by "A" at 426. In the 426 sub-process shown in FIG. 4, maximum power point is tracked and MPPT input DC power is computed at 430. The output power $P_{ac}$ computed at 408 is compared with computed MPPT input DC power at 432. If the output power is less than MPPT power at 432, then the set reference power value $P_{ac\_ref}$ is increased at 434. If the output power is not less than MPPT power at 432, or from 434, or if MPPT input tracking is not applicable, the process 400 proceeds to 412.

At 412 the output voltage $V_{ac}$ sampled at 406 is compared with a preprogrammed $V_{ac\ max}$ value. If the output voltage $V_{ac}$ is greater than $V_{ac\ max}$, then the set reference power $P_{ac\text{-}ref}$ is decreased at 414 by computing and processing module 120. If the output voltage $V_{ac}$ is not greater than $V_{ac\ max}$, or from 414, the process 400 proceeds to 416.

At 416, the output voltage $V_{ac}$ sampled at 406 is compared with a preprogrammed $V_{ac\ min}$ value. If the output voltage $V_{ac}$ is less than $V_{ac\ min}$, then computing and processing module 120 generates an alarm and communicates the alarm to the load manager 150 via the communication link 134 for managing the loads. If the output voltage $V_{ac}$ is not less than $V_{ac\ min}$, or from 418, the process 400 proceeds to 420.

At 420, the deviation of computed output power $P_{ac}$ at 408 from the set reference power $P_{ac\text{-}ref}$ is computed by computing and processing module 120. At 422 the closed loop power control algorithm 118 applies a correction and the PWM module 108 generates a compensated PWM drive signal based on the deviation computed at 420. This power control process flow (steps 406-422) and sub-process 426 for applicable MPPT input sources) is repeated at high frequency (for example 56 KHz) with time interval Δt (for example 17.85 micro seconds) as indicated in step 424.

Figure 5:
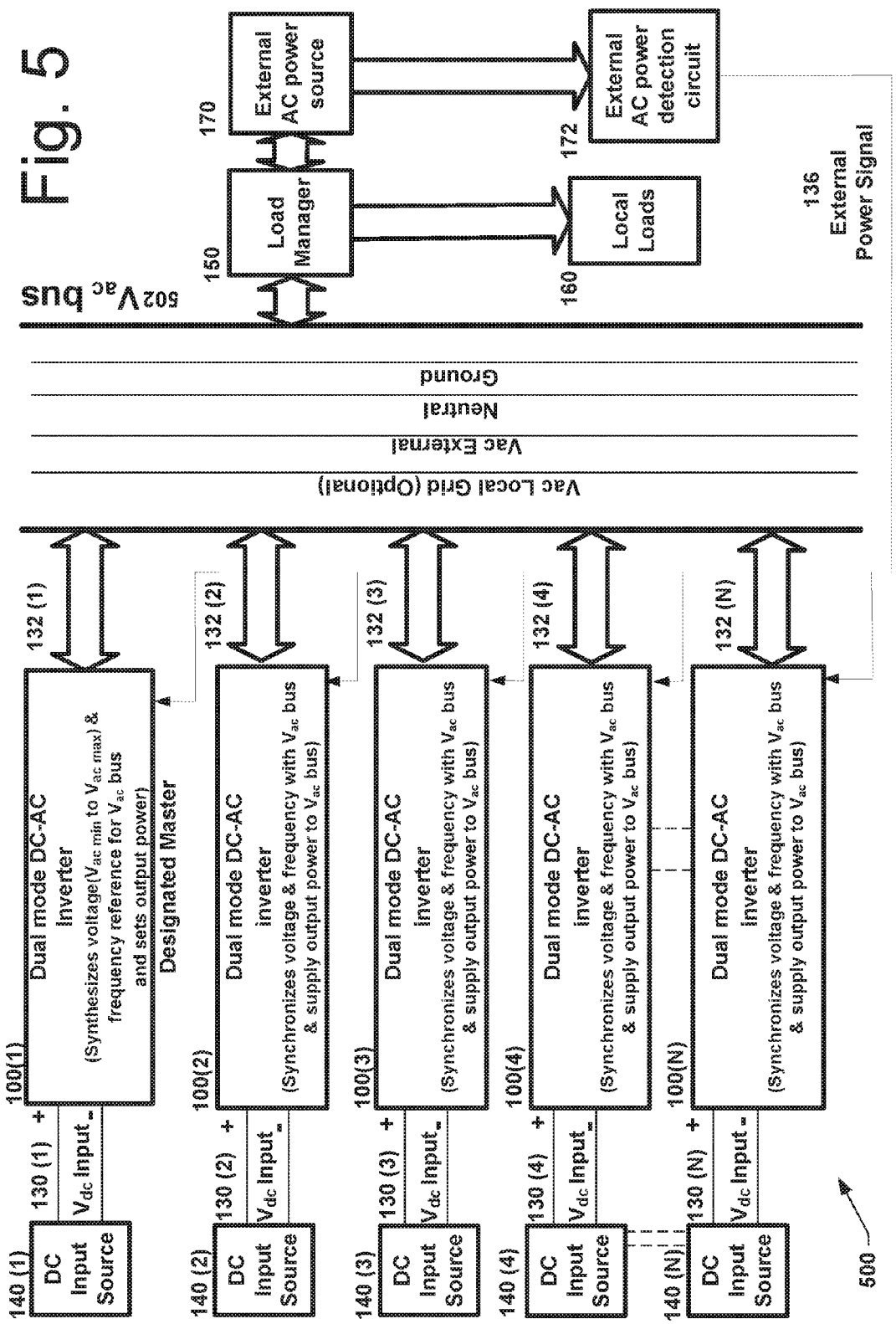
FIG. 5 is a schematic block diagram of an example array of dual mode DC-AC inverters operating when an active external power source is absent (i.e., in a power control mode of operation) illustrating example sub-systems of the array along with input, output, and communication interfaces.

FIG. 5 is a schematic block diagram of an example array of dual mode DC-AC inverters 500 working together with example input, output, and communication interfaces. FIG. 5 shows a plurality of dual mode DC-AC inverters 100(1), 100(2), 100(3), ..., 100(N) in the array 500, each interfaced with a corresponding DC input source 140(1), 140(2), 140(3), ..., 140(N), respectively. $V_{dc}$ input 130(1)-(N) represents the analog signal input from the direct current (DC) input sources 140(1)-(N) to the dual mode DC-AC inverters 100(1)-(N) respectively. $V_{ac}$ interface voltage AC output 132(1)-(N) of the array of inverters 500 is coupled to a load manager 150 through a $V_{ac}$ bus 502. The load manager 150 is, in turn, coupled to an external AC power source 170 and one or more local loads 160. A control circuit 172 may be configured to detect the presence or absence of active external AC power in the external AC power source 170, communicate the status via an external power signal 136 to each one of the dual mode DC-AC inverters 100(1), 100(2), 100(3) ... 100(N) in the array 500 for mode selection.

In the example shown in FIG. 5, the active External AC power source 170 can be absent or inactive, in some instances, and hence one of the dual mode DC-AC inverters, such as the inverter 100(1) shown in FIG. 5, can be designated as a master inverter 100(1). The master dual mode DC-AC inverter 100(1) may be configured to (i) synthesize an output AC voltage within a specified range (min-max), (ii) synthesize a frequency reference, and (iii) set an output reference power of $V_{ac}$ bus 502 in order for remaining ones of the inverters 100(2), 100(3) ... 100(N) in the array 500 to synchronize with the synthesized references from $V_{ac}$ bus 502. The designation of the master 100(1) can be accomplished by either fixed hardware assignment or through a polling process as will be described in FIG. 6. The synthesis of the voltage within specified range (min-max), the frequency reference, and the setting of output reference power may be accomplished by employing a built in reference function or a table as part of the closed loop power control algorithm 118.

Figure 6:
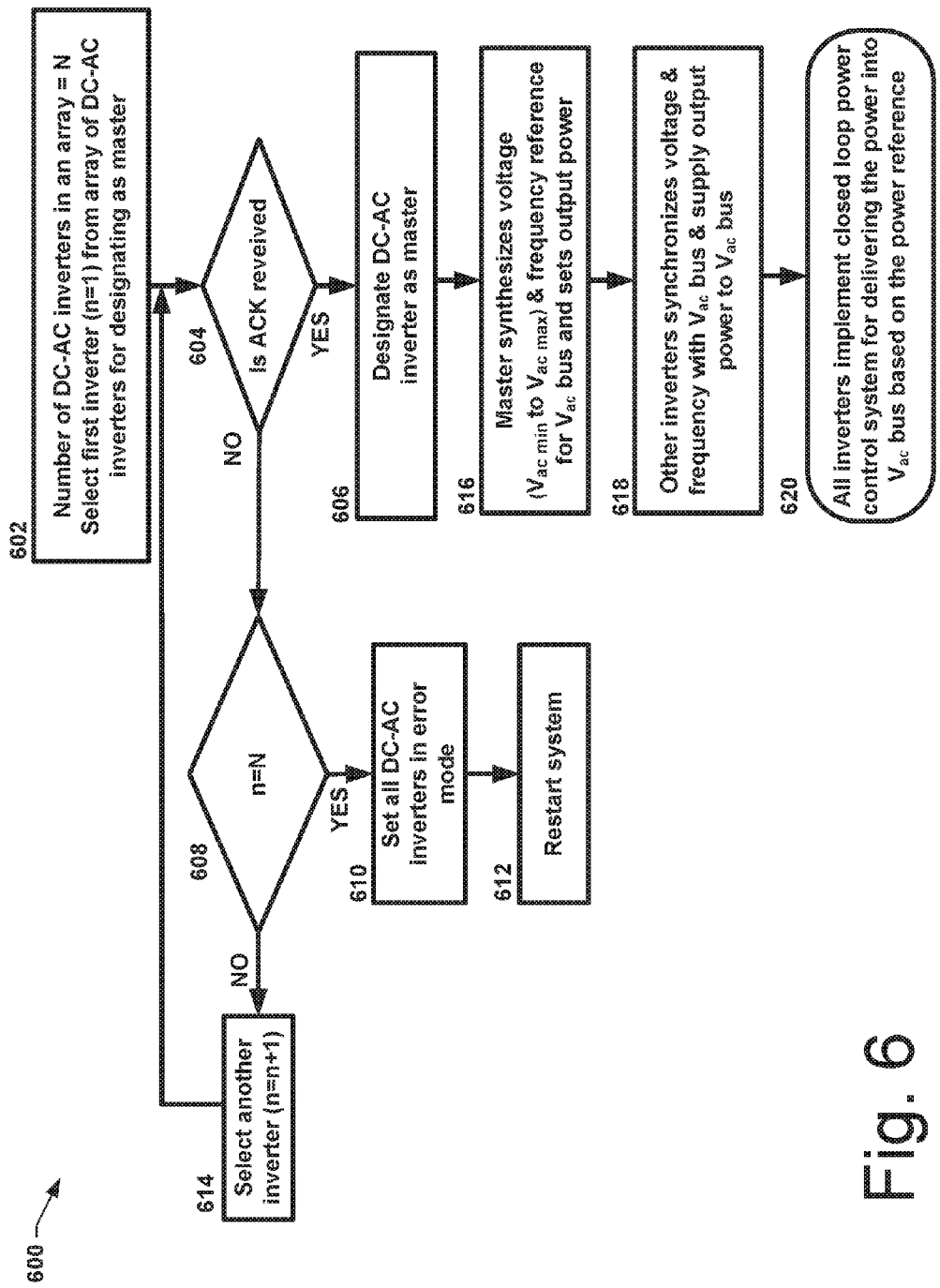
FIG. 6 is a flow diagram of an illustrative process for selecting and designating a master DC-AC inverter from an array of DC-AC inverters for establishing the reference voltage and frequency and setting the output power in a power control mode of operation.

FIG. 6 is a flow diagram of an illustrative process 600 for the selection and designation of the master dual mode DC-AC inverter, such as the inverter 100(1) in FIG. 5, when the array 500 of inverters 100(1)-(N) is operating in the power control mode (the external AC power source 170 is absent or inactive). At 602, a number 1 through N is assigned for each one of the dual mode DC-AC inverters 100(1)-(N) in the array 500, and a query signal is sent to a first inverter 100. In steps 604 and 606, if the first inverter 100 responds to the query with a positive acknowledgement, the first inverter 100 is designated as the master. If a positive acknowledgement is not received from the first inverter 100 at 604, the query is sent (e.g., resent, forwarded, etc.) to a subsequently numbered dual mode DC-AC inverter 100 by proceeding to steps 608 and 614. The query process continues until an acknowledgement is received at 604 from a given inverter and a master is designated at 606, or until all of the N dual mode DC-AC inverters have been queried without a positive acknowledgment, in which case, the process 600 proceeds to 610 where all of the inverters 100 in the array 500 can be set in error mode, and the system restarts at 612.

At 616, subsequent to designation of an inverter 100(1) as the master at 606, the master dual mode DC-AC inverter 100(1) may configure itself to synthesize the voltage within specified range (min-max) and frequency reference by employing a built-in reference function or a table as part of the closed loop power control algorithm 118 and apply the synthesized voltage range (min-max) at the reference frequency, and the master inverter 100(1) sets the output power at the $V_{ac}$ bus 502.

Once the voltage within the specified range (min-max) at the reference frequency is applied to the $V_{ac}$ bus 502 and the power of $V_{ac}$ bus 502 is set using power control algorithm 118 by the master dual mode DC-AC inverter 100(1) at 616, the other DC-AC inverters 100(2), 100(3) ... 100(N) may synchronize their output voltage and frequency with the $V_{ac}$ bus 502 and supply output power to the $V_{ac}$ bus 502 at 618. At 620, closed loop power control is implemented to deliver the power to $V_{ac}$ bus 502. For example, the implementation of closed loop power control mode at 620 for each of the other inverters 100(2)-(N) may be performed according to the process 400 of FIG. 4.

Figure 7:
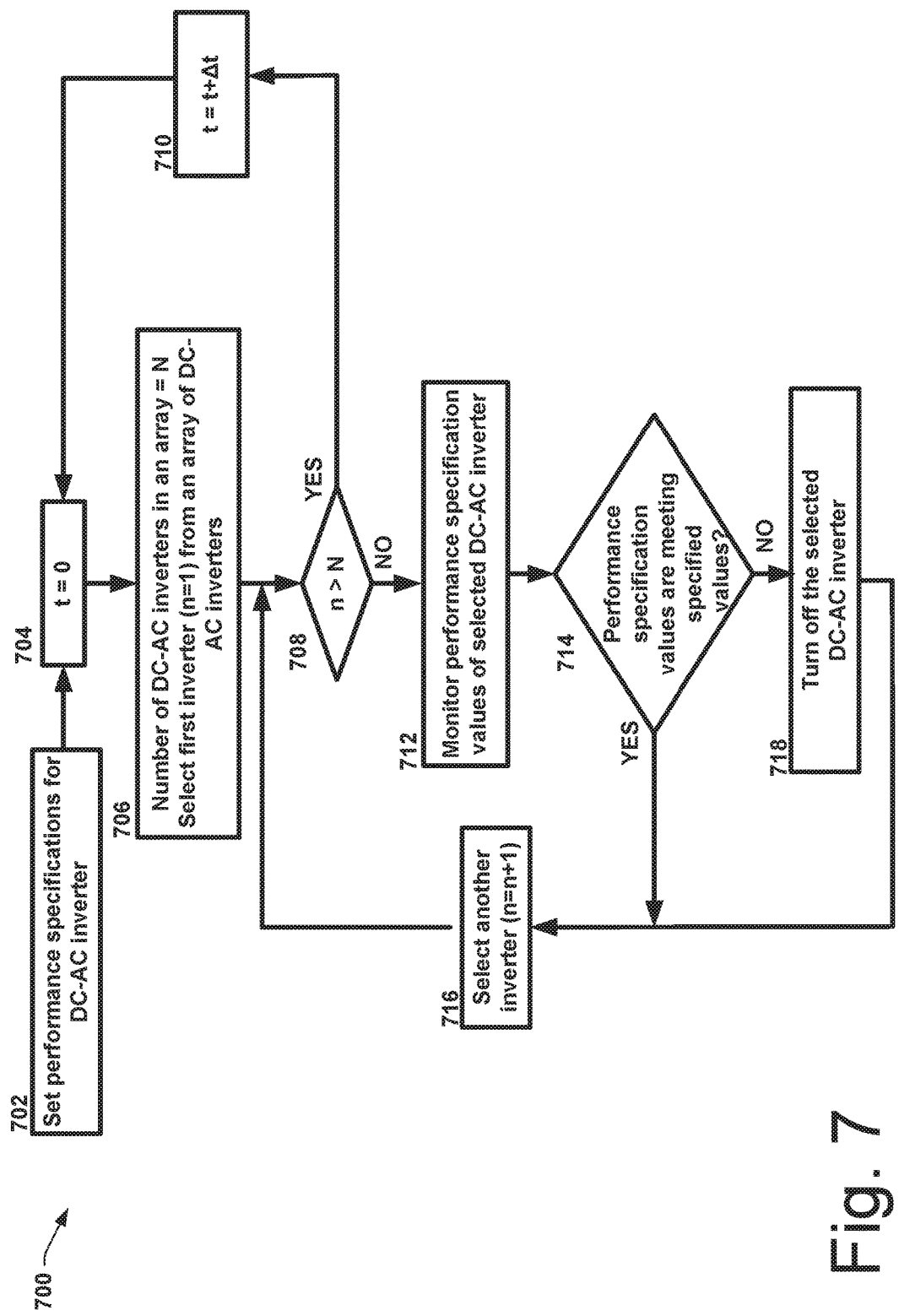
FIG. 7 is a flow diagram of an illustrative process for monitoring the performance of, and controlling, individual ones of the DC-AC inverters in an array of DC-AC inverters.

FIG. 7 is a flow diagram of an illustrative process 700 for monitoring the performance and control of each of the DC-AC inverters 100(1)-(N) in an array 500 of DC-AC inverters. Due to the modular nature of the dual mode DC-AC inverters 100(1)-(N), an array 500 of DC-AC inverters 100(1)-(N) can remain functional even if some of the DC-AC inverters 100 in the array 500 are non-operational. Leveraging this concept, self-monitoring and control of the DC-AC inverters 100(1)-(N) in an array 500 may be implemented by the example process 700.

At 702, the performance specifications for each inverter 100(1)-(N) are established. At 704, a clock is set at t=0. At 706, a number 1 through N is assigned for each one of the DC-AC inverters 100(1)-(N) in the array 500. As indicated in the steps 708, 712, 714, and 716, the performance parameters of each one of the DC-AC inverters 100(1)-(N) in the array 500 are collected and verified as to whether they meet the established specifications. As indicated in the decision block 714, if any individual DC-AC inverter of the plurality of inverters 100(1)-(N) is not meeting the established specifications, that DC-AC inverter 100 can be turned off at 718. This monitoring and control process flow is repeated at a defined frequency (for example 1 KHz) with time interval Δt (for example 1 millisecond) as indicated in step 710.

Figure 8:
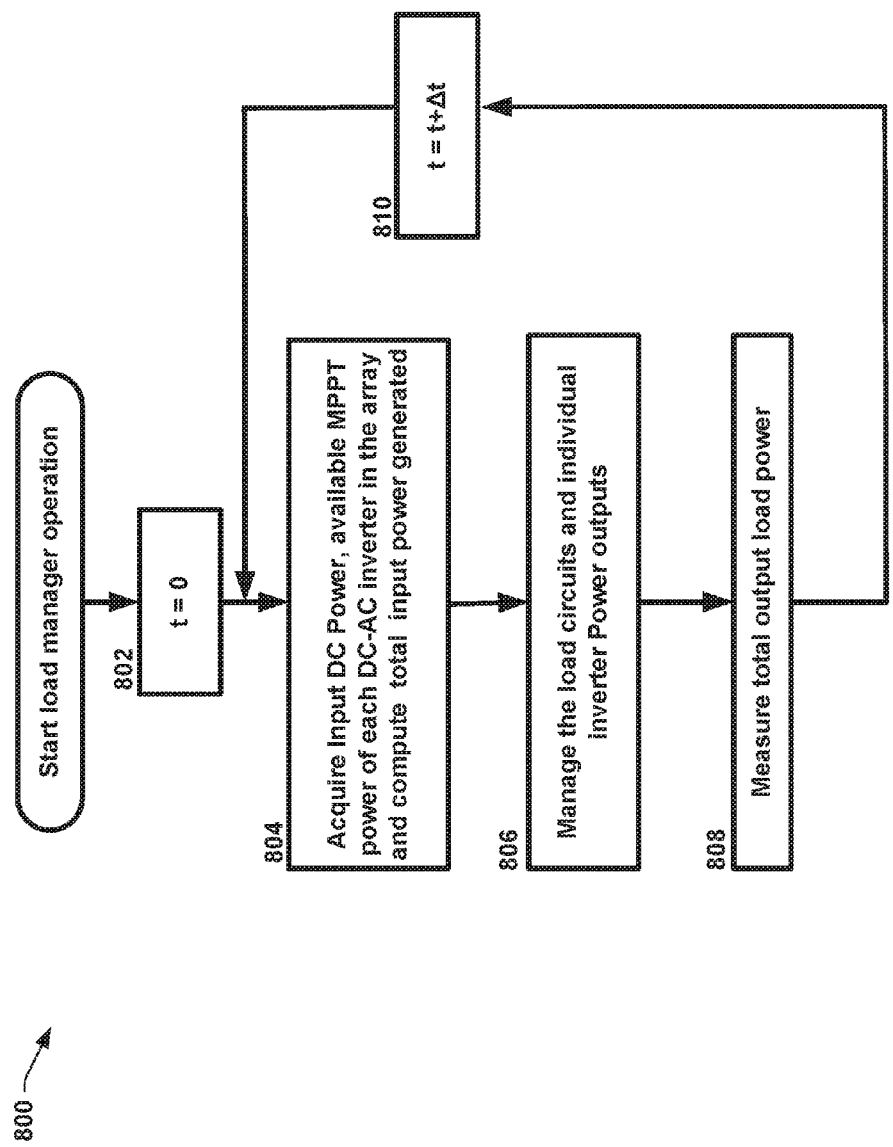
FIG. 8 is a flow diagram of an illustrative process for load balancing among an array of DC-AC inverters working in conjunction with a load manager.

FIG. 8 is a flow diagram of an illustrative process 800 for load balancing among an array 500 of DC-AC inverters 100(1)-(N) working in conjunction with a load manager 150. In the case where an external AC power source 170 is absent, management of one or more local loads 160 may be performed in order to maintain the total load connected to the array 500 of DC-AC inverters at a load that is less than the total output power generated. The load manager 150 acquires the DC input source power from the computing and processing module 120 and the available MPPT power computed at 430 from each of the DC-AC inverters 100(1)-(N) in the array 500 for total power computation. The load manager 150 provides the ability to dynamically calculate the total generated load and manage the local load(s) 160 such that a predetermined load balance condition is satisfied.

At 802, a clock is set at t=0. At 804, the load manager 150 computes the total available DC power by acquiring the DC input source power from the computing and processing module 120, and the available MPPT power computed at 430 from each of the DC-AC inverters 100(1)-(N) in the array 500.

At 806, the load manager 150 controls the output load(s) 160 such that the total output load is less than the total available DC power computed at 804. The load manager 150 computes the power requirements for each of the DC-AC inverters 100(1)-(N) in the array 500 based on the total available DC power computed at 804 and communicates to each of the DC-AC inverters 100(1)-(N) in the array 500 via communication link 134.

At 808, the total output power delivered is measured and recorded. This monitoring and control process flow (steps 804-808) is repeated at a defined frequency (for example 1 KHz) with time interval Δt (for example 1 millisecond) as indicated in step 810.

Figure 9:
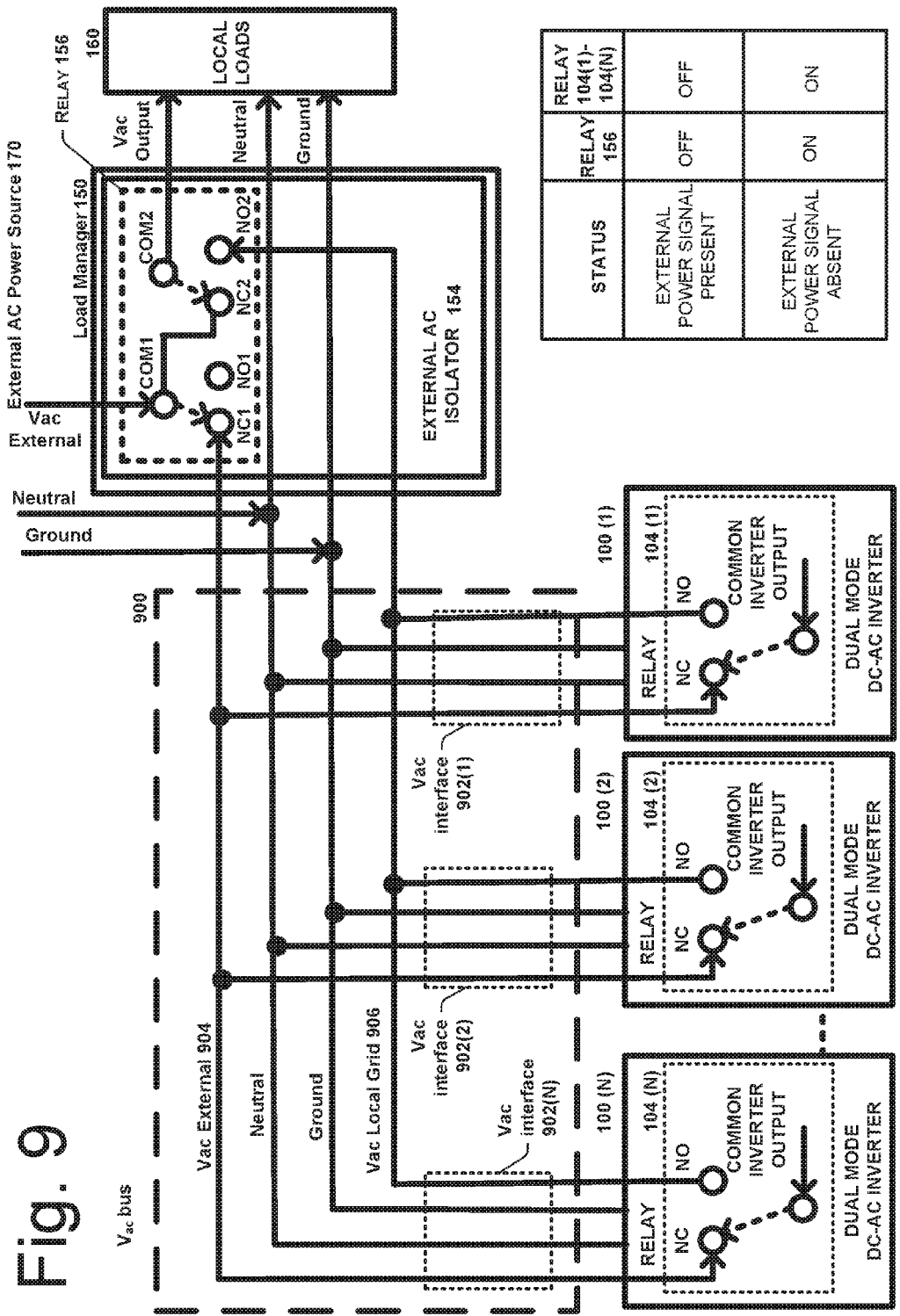
FIG. 9 is an illustrative diagram of a 4 wire connection interconnecting N number of DC-AC inverters with an external AC power source with the ability to disconnect from the AC power source in the event the external AC power source is not active.

FIG. 9 is a schematic block diagram of an array of dual mode DC-AC inverters 100 working together with external AC isolator 154 utilizing a 4-wire interface. FIG. 9 shows a plurality of dual mode DC-AC inverters 100(1), 100(2), ... 100(N) in the array, each interfaced to a $V_{ac}$ bus 900 via a 4-wire $V_{ac}$ interface 902. The external AC power source 170 is linked to the load manager 150 via the external AC isolator 154. The relay arrangement 156 in the external AC isolator 154 can be activated either to connect the external AC power source 170 to the $V_{ac}$ external output 904 or isolate from the $V_{ac}$ external output 904.

The relays 104(1)-(N) of each of the DC-AC inverters 100(1)-(N) in the array can be activated either to connect respective inverter output to the $V_{ac}$ external 904 or the $V_{ac}$ local grid 906

The logic diagram for the relay arrangement 156 and the relays 104(1)-(N) is given in Table 1 below:

TABLE 1

| STATUS | RELAY 156 | RELAY 104(1)-104(N) |
| --- | --- | --- |
| EXTERNAL POWER SIGNAL PRESENT | OFF | OFF |
| EXTERNAL POWER SIGNAL ABSENT | ON | ON |

Employing the relays 156 and 104(1)-(N) and the associated logic, in the current control mode of operation, the external power source 170 and the inverter 100 outputs are connected to the $V_{ac}$ external 904 of the Vac bus 900.

Employing the relays 156 and 104(1)-(N) and the associated logic, in the power control mode of operation, the external power source 170 and the inverter 100 outputs are disconnected from the $V_{ac}$ external 904 of the $V_{ac}$ bus 900. In this case, the inverter 100 outputs are connected to the $V_{ac}$ local grid 904 via the relays 104(1)-(N). The $V_{ac}$ local grid 904 is, in turn, connected to the local loads 160 via relay 156.

Figure 10:
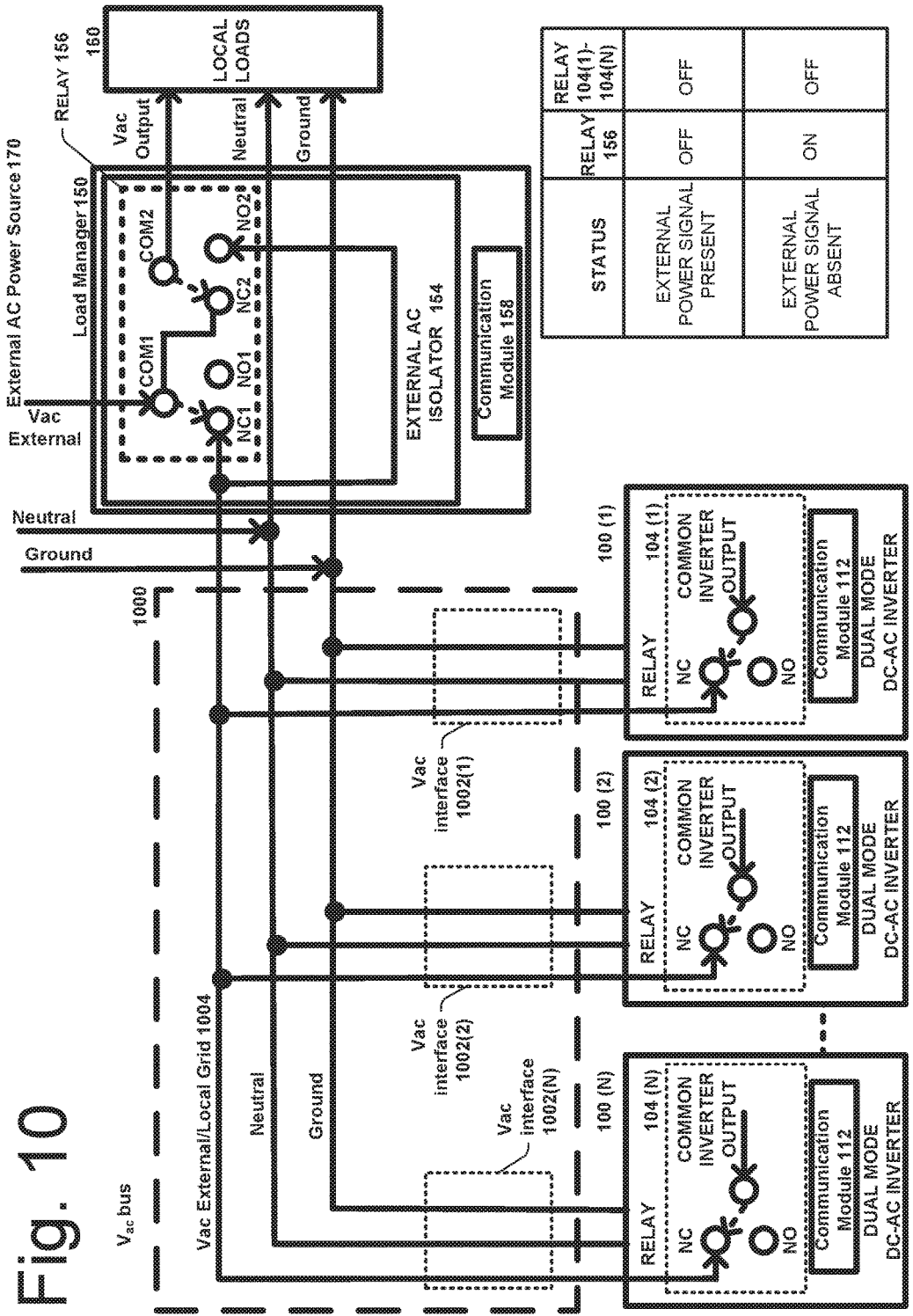
FIG. 10 is an illustrative diagram of a 3 wire connection interconnecting N number of DC-AC inverters with an external AC power source with the ability to disconnect from the AC power source in the event the external AC power source is not active.

FIG. 10 is a schematic block diagram of an array of dual mode DC-AC inverters 100 working together with external AC isolator 154 utilizing a 3-wire interface. FIG. 10 shows a plurality of dual mode DC-AC inverters 100(1), 100(2), ..., 100(N) in the array, each interfaced to a Vac bus 1000 via a 3-wire $V_{ac}$ interface 1002. The external AC power source 170 is linked to the load manager 150 via the external AC isolator 154. The relay arrangement 156 in the external AC isolator 154 can be activated either to connect the external AC power source 170 to the Vac external/Local Grid output 1004 or isolate from the Vac external/Local Grid output 1004.

The relays 104(1)-(N) of each of the DC-AC inverters 100(1)-(N) in the array can be activated either to connect or disconnect respective inverter 100 output to the $V_{ac}$ external/Local Grid 1004.

The logic diagram for the relay arrangement 156 and the relays 104(1)-(N) is given in Table 2 below.

TABLE 2

| STATUS | RELAY 156 | RELAY 104(1)-104(N) |
| --- | --- | --- |
| EXTERNAL POWER SIGNAL PRESENT | OFF | OFF |
| EXTERNAL POWER SIGNAL ABSENT | ON | OFF |

Employing the relays 156 and 104(1)-(N) and the associated logic, in the current control mode of operation, the external power source 170 and the inverter 100 outputs are connected to the $V_{ac}$ external/Local Grid 1004 of the $V_{ac}$ bus 1000.

Employing the relays 156 and 104(1)-(N) and the associated logic, in the power control mode of operation, the external power source 170 is disconnected from the $V_{ac}$ external/Local Grid 1004 of the $V_{ac}$ bus 1000. In this case the inverter 100 outputs are connected to the $V_{ac}$ external/Local Grid 1004 via the relays 104(1)-(N). The $V_{ac}$ external/Local Grid 1002 is, in turn, connected to the local loads 160 via relay 156. In this case, the $V_{ac}$ external/Local Grid 1004

We claim:

1. A dual mode direct current-to-alternating current (DC-AC) inverter comprising:
   a DC-AC converter to convert direct current (DC) voltage into alternating current (AC) voltage output; and
   a controller subsystem comprising a mode selector to select between operating the DC-AC inverter in at least one of: (i) a current control mode upon receipt of an indication that active external AC power is available, or (ii) a power control mode upon receipt of an indication that active external AC power is unavailable.

2. The dual mode DC-AC inverter of claim 1, wherein the DC-AC converter is configured to employ one or more high frequency transformers operating in at least one of: (i) a single stage DC-AC conversion mode, or (ii) a two stage DC-DC-AC conversion mode.

3. The dual mode DC-AC inverter of claim 1, wherein the DC-AC converter is configured to receive Pulse Width Modulated (PWM) drive signals derived from a closed loop current control algorithm or a closed loop power control algorithm or a combination thereof through a PWM module.

4. The dual mode DC-AC inverter of claim 1, wherein the DC-AC converter is configured to apply a Maximum Power Point Tracking algorithm stored in the controller subsystem.

5. The dual mode DC-AC inverter of claim 1, further comprising one or more sensors and one or more fault protection features for at least one of:
   input DC voltage high/low limits;
   voltage high/low limits for the AC voltage output;
   output current limit; or
   temperature.

6. The dual mode DC-AC inverter of claim 1, wherein the DC voltage that is input to the DC-AC converter is derived from at least one of: (i) a photovoltaic solar panel, (ii) a fuel cell, (iii) a battery, (iv) a wind energy generator, or (v) an ultra capacitor.

7. A method of operating a dual mode direct current-to-alternating current (DC-AC) inverter comprising:
   converting direct current (DC) voltage into alternating current (AC) voltage;
   receiving an indication that external AC power is either available or unavailable; and
   in response to the receiving the indication, selecting between:
      operating the dual mode DC-AC inverter in a current control mode upon determining that the external AC power is available; and
      operating the dual mode DC-AC inverter in a power control mode upon determining that the external AC power is unavailable.

8. The method of claim 7, wherein the indication indicates that the external AC power is unavailable, and wherein the operating the dual mode DC-AC inverter in the power control mode further comprises:
   synthesizing a reference voltage and a reference frequency; and
   regulating an output power of the dual mode DC-AC inverter to substantially match the reference voltage and the reference frequency.

9. A method of operating an array of dual mode direct current-to-alternating current (DC-AC) inverters in response to a connection to an external alternating current (AC) power source being absent or not active, the method comprising:
   designating a dual mode DC-AC inverter in the array as a master inverter;
   establishing a reference output power value, a reference output voltage, and a reference output frequency using the master inverter;
   applying the reference output voltage at the reference output frequency of the master inverter to an AC bus; and
   operating remaining ones of the dual mode DC-AC inverters in the array in power control mode to substantially match respective output voltages and output frequencies of the remaining ones of the dual mode DC-AC inverters with the reference output voltage and the reference output frequency present in the AC bus.

10. The method of claim 9, further comprising:
    sensing, by a control circuit, a presence or an absence of the external AC power source, the external AC power source, when present, being either active or not active; and
    communicating a status to the array based at least in part on the sensing.

11. The method of claim 10, further comprising physically disconnecting, by a relay switching mechanism, the external AC power source from the array in response to the external AC power source being present but not active; and
    forming a local grid independent of the external AC power source to support a local load.

12. The method of claim 11, where the relay switching mechanism is part of either
    a four wire output AC voltage bus; or
    a three wire output AC voltage bus.

13. The method of claim 9, further comprising:
    powering the master inverter in order to establish the reference output voltage and the reference output frequency; and
    in response to the establishing the reference output voltage and the reference output frequency, powering up the remaining ones of the dual mode DC-AC inverters in the array.

14. The method of claim 9, wherein the reference output voltage and the reference output frequency are maintained by the AC bus irrespective of continued operation of the master inverter as part of the array.

15. The method of claim 9, wherein the designating the master inverter comprises:
    polling, by a control algorithm, individual ones of the dual mode DC-AC inverters in the array;
    receiving acknowledgement signals from individual ones of the dual mode DC-AC inverters in the array;
    identifying at least one of the acknowledgement signals as a satisfactory acknowledgement; and
    designating the dual mode DC-AC inverter associated with the satisfactory acknowledgement as the master inverter for setting the reference output power value and establishing the reference output voltage and the reference output frequency.

16. The method of claim 15, wherein the polling comprises:

polling the dual mode DC-AC inverters in the array in a predetermined sequence; and identifying, as the master inverter, a particular DC-AC inverter associated with a first received satisfactory acknowledgement.

17. The method of claim 9, further comprising:

periodically monitoring performance of individual ones of the dual mode DC-AC inverters in the array; and turning off a particular dual mode DC-AC inverter in the array having a performance that does not meet or exceed a predetermined performance threshold.

18. The method of claim 9, wherein the designating the dual mode DC-AC inverter as the master inverter is based at least in part on at least one of a hardware setting or a software setting.

19. A dual mode direct current-to-alternating current (DC-AC) inverter configured to operate in power control mode in response to a connection to an external alternating current (AC) power source being absent or not active, the dual mode DC-AC inverter comprising a power control algorithm to:

set a reference power limit for the dual mode DC-AC inverter;

synthesize a reference voltage and a reference frequency based on a function or a table;

regulate an output power of the dual mode DC-AC inverter based at least in part on the reference power limit; and substantially match an output voltage and an output frequency of the dual mode DC-AC inverter to the reference voltage and the reference frequency.

* * * * *